May 12, 1959  J. G. KAY ET AL  2,885,969
FREE PALLET CONVEYORS
Filed April 26, 1957  4 Sheets-Sheet 1
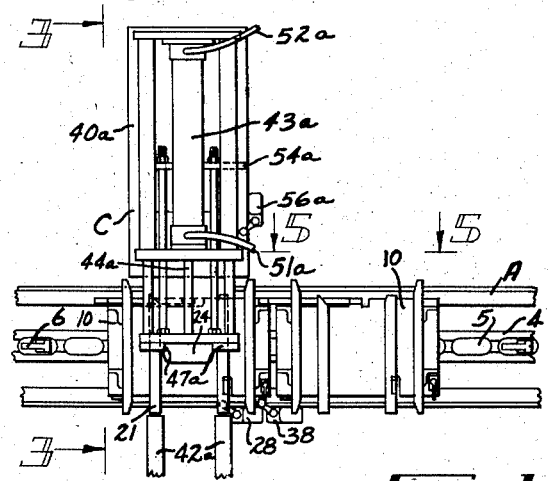
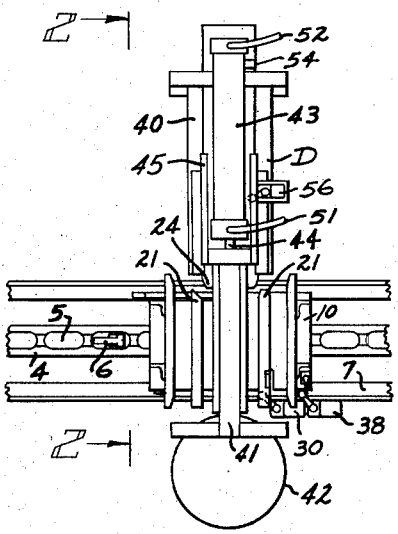
Fig. 1
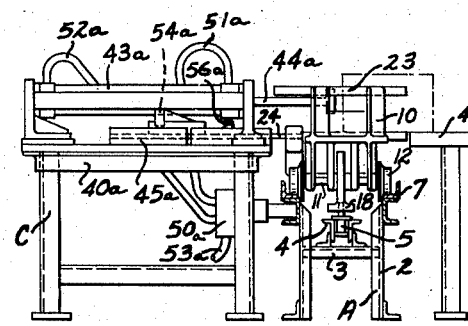
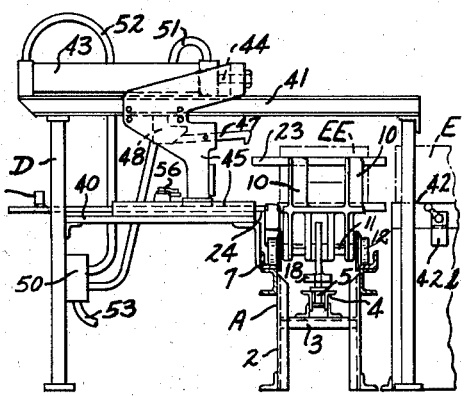
Fig. 2  Fig. 3
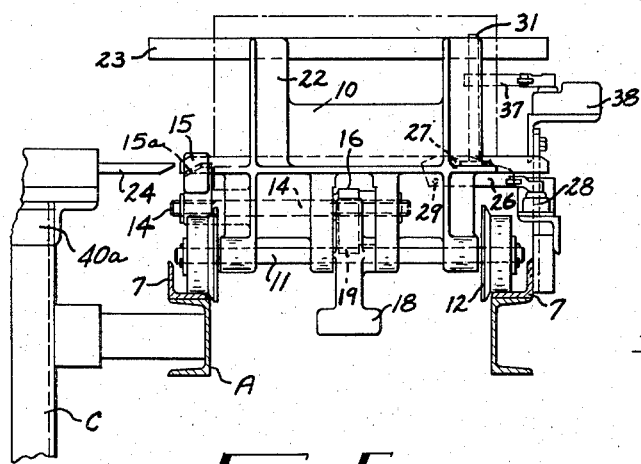
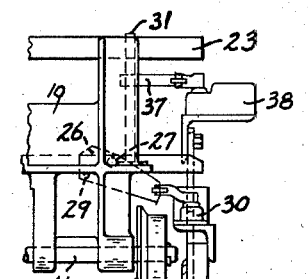
Fig. 6  Fig. 7
INVENTOR.
John G. Kay
Orval A. Oppenhauser
BY
Attorney INVENTORS
John G. Kay
Orval A. Opperthauser
BY
Attorney

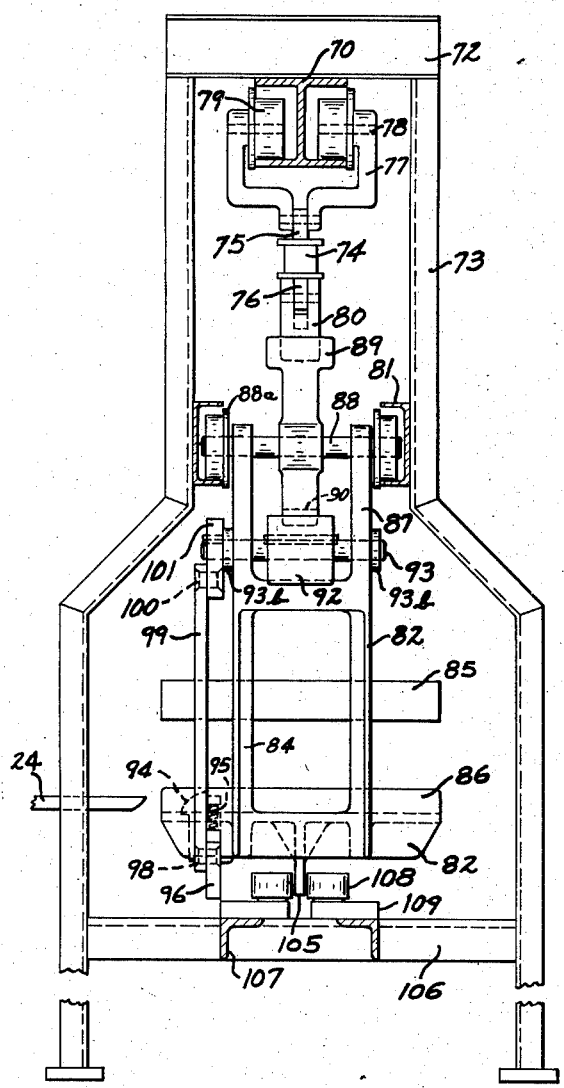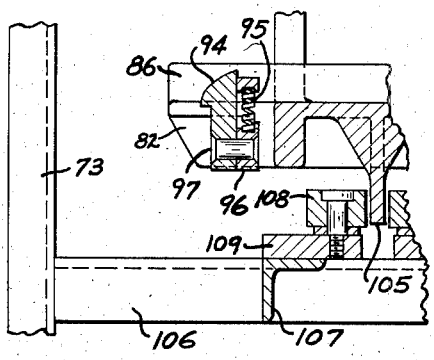
Fig. 15
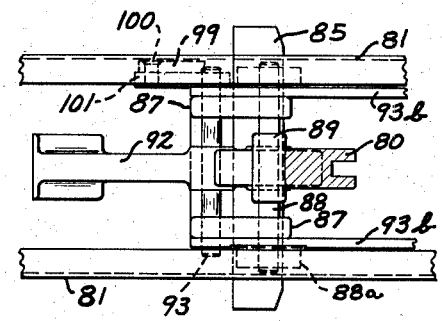
Fig. 16
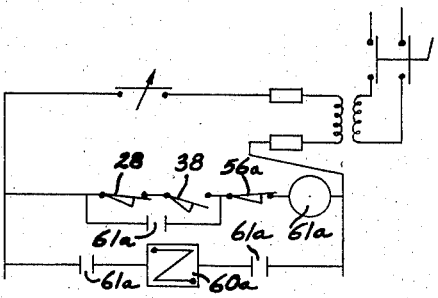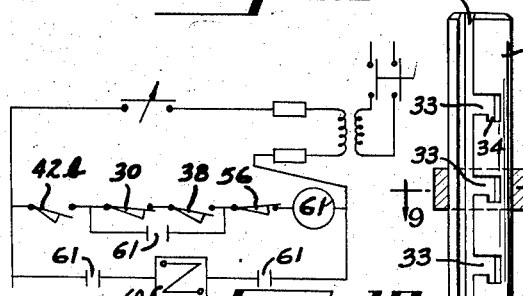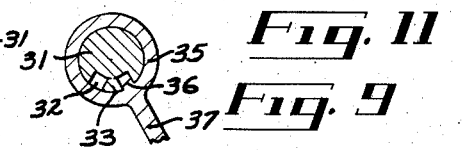
INVENTORS
John G. Kay
Orval A. Opperthauser
BY
Attorney INVENTORS
John G. Kay,
Orval R. Opperthauser
BY
*[signature]*
Attorney.

United States Patent Office 2,885,969
Patented May 12, 1959

2,885,969

FREE PALLET CONVEYORS

John G. Kay, Detroit, and Orval A. Opperthauser, Bloomfield Township, Oakland County, Mich., assignors to F. Jos. Lamb Company, Warren Township, Macomb County, Mich., a corporation of Michigan Application April 26, 1957, Serial No. 655,133

11 Claims. (Cl. 104—172)

This invention relates to improvements in free pallet conveyors.

At the present time free pallet conveyors are in use wherein conveyor chains are provided at spaced intervals with carriers which are spring urged to their operative positions to engage latches on pallets and move the latter with the chains. In such an arrangement, however, if a pallet is held stationary for any cause, such as for loading or unloading, passing carriers are forced by the latch on the stationary pallet to their inoperative positions against the tension of their springs, and after passing the latch, the carriers are returned to their operative positions by their springs. This form of construction is open to several objections. For instance the constant movement of the carriers from one position to another imposes a serve strain upon them which often results in defective operation and spring breakage; again the constant clatter as the carriers move from one position to the other creates a very objectional noise factor.

It is an object of the invention to provide a free pallet conveyor wherein the carriers are so mounted on the chain that the use of springs for returning them to their operative position is eliminated. Thus doing away with a major cause of shut-downs for repairs, and materially reducing noise caused by operation of the conveyor.

This invention also aims to provide a free pallet conveyor wherein a continuously travelling chain has carriers so pivoted thereon that they tend to remain immovable relative to and against the chain in position to engage latches projecting from pallets to advance the latter along tracks extending parallel with the path of movement of the chain; wherein the pivot mounting of the carriers permits them to be rotated by the latches when the pallets are independently advanced along the tracks to pass the carriers; and wherein the carriers are so weighted that they tend to reassume their latch engaging positions.

Other objects of the invention are to provide a free pallet conveyor wherein releasable means including a lever are pivoted on each pallet for normally holding its latch in its carrier engaging position; wherein the lever of each pallet is adapted to be tripped by a projection on the pallet in front as one pallet approaches a preceding one, whereby the releasable means disengages its latch so that the carrier by which that pallet was being advanced continues its travel and the pallet remains stationary; and wherein the releasable means and the latches are each so weighted that they tend to return to their operative positions.

A further object of the invention is to provide a free pallet conveyor wherein coacting means are provided on the conveyor and the pallets for actuating loading and unloading mechanisms when the pallets are properly located relative thereto; and for stopping and starting the pallets in timed relation to the operation of the mechanisms.

Figure 1 is a plan view of the invention showing portions thereof extending past a loader and an unloader.

Figures 2 and 3 are sections on the lines 2—2 and 3—3, respectively, of Figure 1.

Figure 6 is an end view of a pallet on a reduced scale.

Figure 7 is a partial end view showing a pallet at another position along the conveyor.

Figure 8 is a detail showing a vertically adjustable trip, and

Figure 9 is a section on the line 9—9 of Figure 8.

Figures 10 and 11 are diagrams showing the electrical circuits employed in connection with the loaders and unloaders, respectively.

Figure 13 is an end view.

Figure 12:
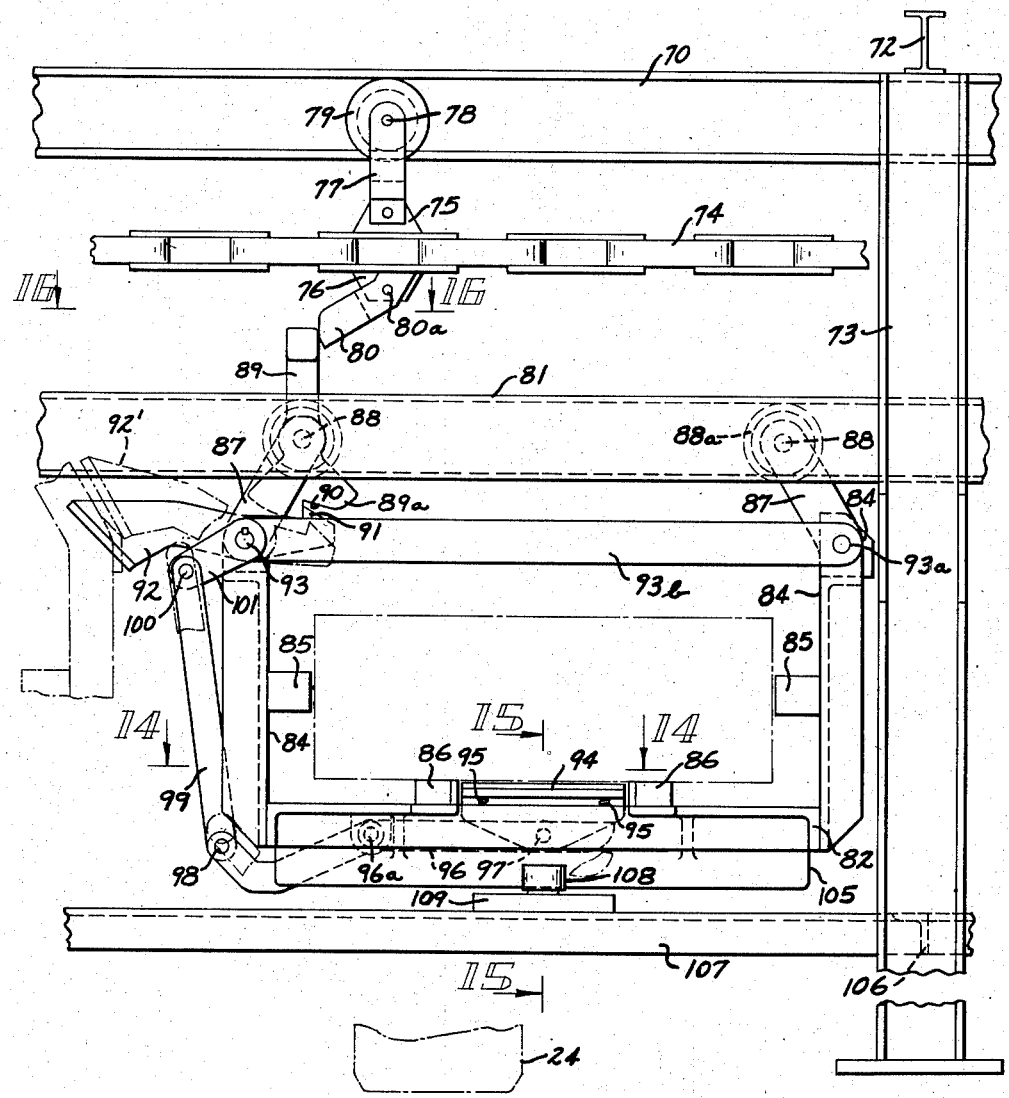
Figure 12 is a side elevation showing a modified form of the conveyor.
Figure 14:
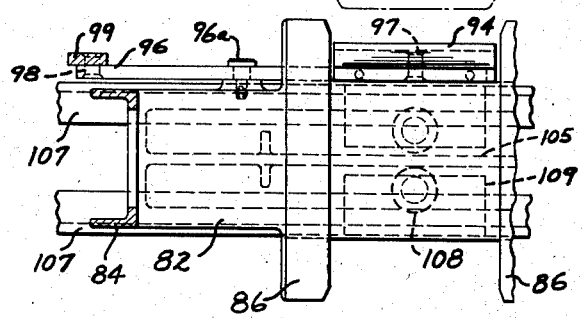

Figures 14, 15 and 16 are sections on the lines 14—14, 15—15, and 16—16, respectively, of Figure 12.

Referring first to Figures 1 to 9, inclusive, A designates a conveyor comprising a frame which inclues two parallel rows of uprights 2 arranged in opposed pairs. Extending between and secured at their extremities to the pairs of uprights are braces 3. Suitably supported on the latter are spaced parallel guides 4 upon and between which an endless conveyor chain 5, which may be driven in any conventional manner (not show) is adapted to travel and pivotally secured upon the chain at required intervals to suit operating conditions are carriers 6. Supported also on the uprights 2 are tracks 7 consisting in this instance of parallel angle members.

Figure 4:
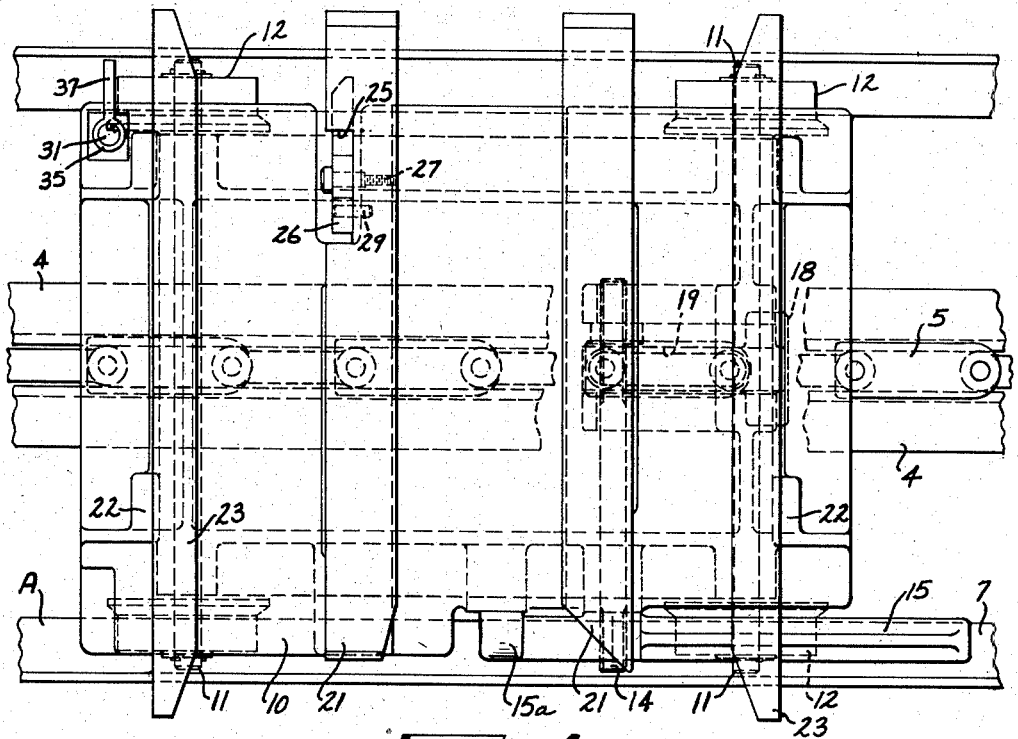
Figure 4 is an enlarged plan view showing a portion of the conveyor including one pallet.
Figure 5:
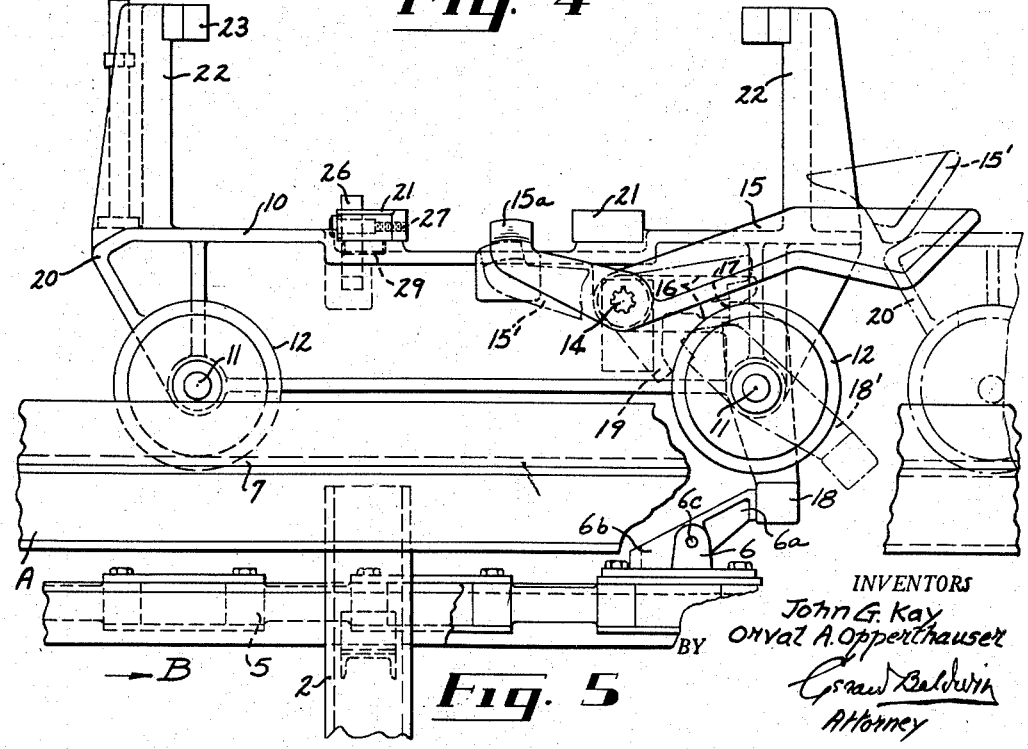
Figure 5 is a side view thereof.

Mounted on the pallets 10 are front and rear axles 11 having wheels 12 thereon adapted to travel along the tracks 7 in the direction of the arrow B, Figure 5. Since all the pallets are the same I will now describe one of them.

Rotatably supported on the pallet 10 is a transverse shaft 14 having a lever 15 and a locking arm 16 secured thereon for rotation therewith. The locking arm 16 has a transverse step 17 extending across its underside which normally engages the rear upper extremity of a latch 18 pivoted on the front axle 11. The latch is of increased weight adjacent its lower extremity so that it tends to assume the vertical position shown in Figures 5 and 6; and when it is engaged by the step 17 it is held against rotation in an anti-clockwise direction, Figure 5. Then the latch is adapted to be engaged by a carrier 6 and the pallet is moved along the tracks 7 by the chain 5. When the locking arm 16 is turned about its axis, as hereinafter described, to disengage the latch 18, the latter is turned to its position 18' by continued travel of its carrier and the latter passes beneath the latch while the pallet remains stationary. 19 denotes a stop, integral in the present instance with the locking arm, to limit the pivotal movement of the latch 18.

Each pivoted carrier 6 includes a forwardly and upwardly extending extremity 6a to engage a latch 18, and a rearward extremity 6b which is heavier than the extremity 6a and normally rests upon the chain 5. The pivotal mounting 6c of the carriers permits them to be turned in a clockwise direction, Figure 5, if a pallet is moved to the right past one or more of them.

The front extremity of the lever 15, which projects in front of the pallet 10, is forwardly and upwardly inclined, and forming part of each pallet is a rearward projection 20. As a second pallet approaches a stationary one from behind, the rear projection 20 on the stationary pallet contacts the front extremity of the lever 15 on the following pallet and moves the latter to its position 15', Figure 5, thereby turning the locking arm 16 thereon to release its latch 18 so that carriers may pass. The following pallet then remains stationary until the preceding one has moved forward sufficiently to permit the lever on the rear pallet and its locking arm to drop back to their operative positions whereupon the latch on the rear pallet is again held immovable to be advanced by one of the carriers 6. It will be noted that the lever 15 is so proportioned and weighted that it naturally reassumes its normal position as soon as it is free to do so.

Mounted upon and extending across the top of the pallet 10 intermediately of its length are spaced, parallel wear strips 21 to receive a workpiece (not shown); and extending upwardly across the pallet adjacent its opposite extremities are front and rear guide members 22 having locating strips 23 on their inner faces to support a workpiece upon the wear strips against material longitudinal movement.

The outer face of the lever 15 at its rear extremity is upwardly and inwardly inclined to form a camming face 15a which is located longitudinally between the wear strips above the top of the pallet, so that when a locator 24, hereinafter referred to, is moved laterally inward across the camming face the rear extremity of the lever is depressed thereby moving it to its latch releasing position 15'.

Formed in one side of one of the wear strips 21 is a recess 25 extending transversely of the pallet to receive a trip 26, which, intermediately of its length, is pivoted on a pin 27 extending through the recessed strip. When the pallet is loaded and a workpiece is resting on the wear strips the inner extremity of the trip is depressed, as shown in Figure 6, thereby holding the outer extremity thereof in its raised position to actuate a limit switch 28 mounted on the frame of the conveyor A. Due to the fact that the outer extremity of the trip 26 extends farther from its axis and is heavier than its inner extremity, when the pallet is unloaded the inner extremity of the trip moves upwardly and a stop 29 projecting therefrom engages the underside of the adjacent wear strip. Then the outer extremity of the trip has dropped correspondingly and is positioned to engage a limit switch 30 mounted on the frame of the conveyor A at a lower elevation than the switch 28. The limit switches 28 and 30 are mounted on the conveyor frame substantially opposite an unloader C and a loader D, respectively; and the upper face of the trip 26 is so shaped that it may be readily depressed by a workpiece as the latter is being slid across the wear strips 21 from either side of the pallet.

Mounted also on the pallet is a post 31, shown in detail in Figures 8 and 9, having a vertical keyslot 32 formed therein from its upper extremity and extending around the post from the slot 32 are a plurality of vertically spaced segmental grooves 33 each terminating at its outer extremity in a depressed recess 34. Mounted on the post 31 is a ring 35 having an inwardly projecting key 36 therein slidable in the slot 32 and adapted to be moved circularly around one of the grooves 33 to engage the recess 34 therein, by which the ring is adapted to be held against accidental rotation. Formed integral with the ring 35 and projecting radially therefrom is a trip arm 37. Mounted for vertical adjustment on the frame of the conveyor A opposite an unloader C, or loader D, is a limit switch 38 which may be vertically adjusted to be engaged by the trip arm 37. The purpose of this arrangement is that when a number of different unloaders, or loaders, are arranged in a row, different pallets may be stopped in front of different unloaders, or loaders, by adjusting the heights of the trip arms and the limit switches with which they are to cooperate. To complete a circuit both the limit switches 28, or 30, and 38 must be closed.

In Figure 1 portions of a conveyor A, including the tracks 7 with pallets 10 thereon, and guides 4 for the chain 5 are shown extending past a loader D and an unloader C. Since both the latter are well known I will only briefly describe them and their operation.

The loader D, which is also shown in Figure 3, includes a lower guide 40 extending at right angles from one side of the conveyor A, and mounted above and in vertical alignment with the lower guide is an upper guide 41 which also projects over the conveyor. On the opposite side of the latter in alignment with the guides is a table 42. Secured upon the upper guide is a double acting cylinder 43 having a piston therein from which a piston rod 44 projects. Mounted for reciprocation on and between the guides 40 and 41 is a slide 45 to which the piston rod 44 is connected. A workpiece E to be loaded onto a pallet 10 is placed upon the table 42, and, in order to properly position a pallet to receive it, a locator 24 is mounted upon and projects forwardly from the slide 45. The outer lateral margins of the locator are forwardly and inwardly inclined so that as it is advanced between the wear strips 21 it moves the pallet to its correct loading position along the tracks 7. The front of the locator 24 contacts the camming face 15a before it travels between the wear strips and depresses the rear of the lever 15 thereby releasing the latch 18 so that it may swing freely about its axis and allow carriers to travel past it. Thus outward movement of the piston rod 44 and locator 24 stops the pallet and positions it for loading. During that movement a hook 47 suitably mounted on the slide 45 is advanced across the conveyor to engage a workpiece E on the table 42 so that upon the return stroke of the piston rod 44 the workpiece is pulled onto the wear strips to its position EE, after which the hook is released therefrom in the conventional manner by a camming member 48.

The piston in the cylinder 43 may be either hydraulically or pneumatically operated. Connected to opposite extremities of the cylinder are suitable lines 51 and 52 which are also connected to a conventional solenoid operated control valve 50 having a spring return which is mounted on the loader. From the valve 50 a line 53 also extends to a source of fluid pressure, such as compressed air. Mounted on the slide 45 is a trip 54, and secured on the guide 40 to be actuated by the said trip when it reaches the conveyor end of its stroke is a limit switch 56. When the valve is actuated to admit fluid under pressure through the line 52 into the cylinder 43 the slide is moved until the trip 54 engages the limit switch 56 whereupon the spring return in the valve 50 closes the latter to the line 52 and opens it to the line 51 whereby the direction of movement of the piston rod is reversed. When this type of valve 50 is employed the fluid pressure retains the piston rod at its inward position in the cylinder until the valve is again actuated.

When both the limit switches 28 and 38 on the conveyor frame opposite that loader are closed a relay circuit hereinafter described, which includes the control valve 50, is energized. Moreover while the switch 38 and its trip arm 37 may be omitted if it is desired to stop a pallet in front of the first loader it comes to, the limit switch 30 together with its trip 26 must be employed as there would be no purpose in stopping a pallet in front of a loader if it were already loaded. For it will be understood that while only one loader D and one unloader C are shown, it is customary to arrange several of each in a row.

The unloader C, shown in Figures 1 and 2, includes a guide 40a upon which a double acting cylinder 43a is mounted. Extending from the piston in the cylinder is a rod 44a which is connected to a slide 45a mounted for reciprocation on the guide. Carried by the slide and projecting forwardly therefrom is a locator 24 for contacting the camming face 15a on the pallet to stop the latter, and also for engaging the wear strip thereon and properly locating it for unloading. Projecting forwardly from the slide 43a are pads 47a to engage a workpiece on the wear strips and push it off onto a rack 42a. On the frame of the unloader a solenoid operated control valve 50a, similar to the valve 50, is connected by lines 51a and 52a to opposite ends of the cylinder 43a; the valve 50a is also connected by a line 53a to a source of fluid under pressure. Mounted on the slide 45a is a trip 54a and secured on the guide 40a to be actuated thereby when the slide reaches the conveyor end of its stroke is a limit switch 56a. When the limit switches 28 and 38 on the conveyor frame opposite that unloader are closed a relay circuit similar to the one above referred to including the control valve 50a is energized.

I will now describe the relay circuit employed in conjunction with the loader with the aid of the diagram shown in Figure 10.

42b denotes a limit switch mounted on the table 42 and adapted to be closed by a workpiece E resting upon the latter. When the limit switches 42b, 30 and 38 are closed a solenoid 60 in the control valve 50 is energized and fluid under pressure flows therethrough from the line 53 into the cylinder 43 through the line 52. The slide 45 is then advanced across the conveyor. When the slide reaches its forward limit of travel the trip 54 actuates the limit switch 56 thereby energizing a circuit relay 61 and releasing the solenoid 60 so that the spring return in the control valve operates to connect the line 53 with the line 51. The slide is then moved back from the conveyor and the pressure in the cylinder retains the slide at its inward position until the limit switches 42b, 30 and 38 are again actuated.

For unloading, the limit switches 28 and 38 are closed to energize the solenoid 60a in the control valve 50a whereby the lines 53a and 51a are connected and the slide 45a is advanced across the conveyor. When the slide reaches its forward limit of travel it actuates the limit switch 56a and energizes a circuit relay 61a whereby the solenoid is cut out and the spring return in the control valve becomes effective. Then the lines 53a and 51a are connected and the slide is moved back from the conveyor, and the lines 53 and 51 remain connected until the limit switches 28 and 38 are re-actuated.

Referring now to the modification shown in Figures 12 to 16, inclusive, 70 designates longitudinal guide means, consisting in this case of an I-beam monorail, which is dependingly supported at spaced intervals by transverse beams one of which is shown at 72; the opposite extremities of the beams are secured to frame members 73. A conventional endless chain 74, driven by any suitable means not shown, is provided at spaced intervals with vertically aligned upper and lower tongues 75 and 76, one pair of which is shown. Secured to opposite sides of each upper tongue 75 and projecting above the latter are brackets 77 inwardly from which horizontally aligned pins 78 project having rollers 79 mounted thereon which are adapted to travel along opposite sides of the guide means 1. Mounted on each lower tongue 76 and pivotally supported thereby is a carrier 80 which normally projects downwardly and forwardly therefrom with its upper face in contact with the underside of the chain 74. Thus when the chain 74 and the carriers 80 are moved to the left, Figure 12, resistance offered by the latch 89, hereinafter referred to, against a carrier holds the latter immovable against the chain. However when not so engaged the carriers are free to be turned in a clockwise direction about their pivot axes 80a, as by a latch being moved to the left, Figure 12, past some of the carriers.

Mounted on the inner faces of the frame members 73 parallel with the guide means 70 and below the latter are spaced, parallel tracks 81, shown in the form of channel members, along which pallets 82 are adapted to travel. Since all the pallets are the same I will now describe one of them.

Extending across opposite extremities of the pallet 82 are front and rear plates 84 inwardly from which pads 85 extend to limit longitudinal movement of workpieces E which rest on wear strips 86 extending transversely of the pallet. Projecting upwardly and longitudinally inwardly from both extremities of the plates 84 are arms 87. Rotatably mounted in the arms 87 and extending between transversely opposed pairs thereof are front and rear axles 88 having wheels 88a thereon which are adapted to travel along the tracks 81. Supported also for rotation on the front axle 88 is the latch 89 one extremity of which normally extends vertically upward for engagement by one of the carriers 80 which then pushes the pallet along the tracks 81. Provided on and integral with the opposite extremity of the latch 89 is a substantially segmental portion 89a which is heavier than its carrier engaging portion and therefore normally hangs downward. Formed across the segmental portion from its arcuate face is a slot 90 adapted to receive a dog 91 which projects upwardly from a lever 92 hereinafter described. By the dog 91 the latch 89 is adapted to be held against rotation so that it remains immovable relative to its pallet as the latter is pushed along by one of the carriers 80.

A shaft 93 parallel with the axles 88, is rotatably supported by and between the front plates 84, substantially beneath the front axle; and keyed on the shaft 93 is a lever 92 so that its dog 91 is moved into position to engage or disengage the slot 90 upon rotation of the said shaft. When the lever is so turned that its dog is disengaged the pallet remains stationary while the chain and its carriers continue their travel. The front extremity of the lever 92 projects forwardly beyond its pallet and is upwardly and forwardly inclined. As a pallet approaches a stationary pallet in front of it, the lever 92 on the following pallet is engaged by the rear plate 84 on the stopped pallet and is turned thereby to its position indicated at 92'. Then the dog on the following pallet is released from its slot 90 and the latch 89 is free to be turned about its axis by passing carriers as the pallet remains stationary. Between the shaft 93 and a second shaft 93a supported by the rear plates 84 reinforcing arms 93b may be provided to retain these shafts in spaced relation.

Mounted for vertical movement on one side of the pallet 82 longitudinally between the wear strips 86 is an actuating plate 94 the outer longitudinal margin of which is downwardly and outwardly inclined. The plate 94 is supported adjacent its opposite extremities on springs 95 the lower extremities of which rest upon an arm 96. Extending horizontally through both the plate 94 and the arm 96 between the springs 95 is a pivot pin 97. The actuating plate is adapted to be depressed by inward movement of a locator 24 to disengage the dog 91 from its latch in a manner hereinafter described; and at the same time the locator by engagement with the opposed inner faces of the wear strips 86 positions the pallet as above set forth.

The opposite extremity of the arm 96 is pivotally connected by a pin 98 to the lower extremity of a link 99 so that upon downward movement of the actuating plate the link is raised as the arm turns about a pin 96a extending from the pallet. The upper extremity of the link 99 is pivoted at 100 to one extremity of an arm 101 the opposite extremity of which is keyed on the shaft 93 so that upon upward movement of the link 99 the lever 92, which is also keyed on the shaft 93, is turned to its position 92', thereby releasing its dog 91 from the slot 90 in the latch 89.

Extending longitudinally from the underside of each pallet 82 is a rib 105. Extending at spaced intervals between the frame members 73 and secured thereto are transverse members 106 between which longitudinal braces 107 extend. Mounted upon the latter opposite locations where pallets are to be stopped are opposed pads 109 having rollers 108 mounted thereon to engage opposite sides of the ribs 105 of pallets and hold them against material transverse movement when they are being loaded or unloaded.

It is understood that in conjunction with the embodiment shown in Figures 12 to 16, inclusive, trips as shown at 26 and 37 may be employed for actuating limit switches as shown at 28, 30 and 38 on the conveyor frame, in Figures 6 and 7, and completing circuits for reciprocating the locators 24.

While in the foregoing the preferred embodiments of the invention have been described and shown, it is understood that further alterations and modifications may be made thereto provided they fall within the scope of the appended claims.

What we claim is:

1. A free pallet conveyor including an endless travelling chain, longitudinal guide means for supporting the chain for movement therealong, carriers projecting at spaced intervals from the chain, tracks mounted in spaced relation to the guide means, pallets adapted to be advanced along the tracks, latches pivoted on the pallets about axes extending transversely thereof, said latches being adapted to be engaged by the carriers whereby the pallets are advanced along the tracks, releasable means including levers pivoted on the pallets about axes parallel with the latch axes for retaining said latches in their carrier engaging positions, said levers being so pivoted that they tend to return the releasable means to their latch engaging positions, and said latches being so pivoted that they tend to return to their carrier engaging positions.

2. A free pallet conveyor for use with a load handling station having a pallet locator shiftable from a position retracted from a pallet at the station to a position extended adjacent a pallet at the station comprising: a traveling chain, guide means for supporting the chain for movement, carriers mounted on and projecting at spaced intervals from the chain, tracks mounted in spaced relation to the guide means, pallets adapted to be advanced along the tracks, a latch shiftably mounted on each pallet for engagement by the carriers whereby the latch is shifted out of the path of the carriers by each carrier that engages the latch, releasable means on each pallet for locking the latch against shiftable movement by the carriers whereby the latch cooperates with a carrier to move a pallet along said tracks, and said releasable means having a part engageable by said pallet locator when a pallet reaches the loading station whereby shifting of the locator from the retracted to the extended position actuates the releasable means to unlock the latch.

3. A free pallet conveyor including a travelling chain, longitudinal guide means for supporting the chain for movement therealong, carriers mounted on and projecting at spaced intervals from the chain, tracks mounted in spaced relation to the guide means, pallets adapted to be advanced along the tracks, a latch shiftably mounted on each pallet for engagement by the carriers and shiftable by successive carriers out of the path thereof, and releasable means on each pallet and including a part for engaging the latch when the same is in a carrier engaging position and retaining it against said shiftable movement by a carrier whereby the pallet may be advanced by one of the carriers.

4. The combination in claim 3, wherein the latch is so weighted that it resumes the carrier engaging position following each shifting by a carrier out of the path of carrier movement, and the releasable means is so weighted that it tends to re-assume the latch engaging position.

5. The combination in claim 3, wherein the carriers are pivotally mounted on the chain, said carriers being so shaped that they are adapted to be held immovable relative to and against the chain by the latches on the pallets when the chain advances relative to the pallets and pivotable out of the path of the latches when the pallets and chain move relative to each other in the opposite direction.

6. A free pallet conveyor including a travelling chain, longitudinal guide means for supporting the chain for movement therealong, carriers secured to and projecting at spaced intervals from the chain, tracks mounted in spaced relation to the guide means, pallets adapted to be advanced along the tracks, a latch pivotally mounted on each pallet for engagement by successive carriers to be pivoted out of the path of the carriers as each carrier engages the latch, and releasable means mounted on the pallet and including a pivoted part for locking the latch in its carrier engaging position.

7. The combination in claim 6, including limit switches supported at different heights relative and in spaced relation to the tracks, support means on each pallet upon which a workpiece is adapted to rest, a trip pivoted on each pallet and projecting outwardly therefrom, the inner extremity of the trip normally projecting above said support means and its outer extremity being adapted to engage the lower limit switches, the inner extremity of the trip being adapted to be depressed by a workpiece on the support means whereby its outer extremity is raised to actuate the higher limit switches, each lever having an inclined camming face thereon, locators mounted for reciprocation at right angles to the tracks adapted to engage the camming faces and actuate the latch releasing means on the pallets, electrical means including a relay circuit for reciprocating each locator, each circuit including one of the limit switches whereby each loaded pallet is adapted to be stopped by some of the locators and each empty pallet is adapted to be stopped by the other locators, and each limit switch being positioned to complete a circuit when a pallet is opposite the locator connected thereto.

8. The combination in claim 6, including a post mounted on each pallet, a vertically adjustable trip on each post, supports mounted adjacent and in spaced relation to the tracks, a limit switch mounted for vertical adjustment on each support, the trips being adapted to actuate some of the limit switches, each lever having an inclined camming face thereon, locators mounted for reciprocation at right angles to the tracks to engage the camming faces and actuate the latch releasing means on the pallets, electrical means including a relay circuit for reciprocating each locator, and each circuit including one of the limit switches, each switch being positioned relative to the locator in its circuit whereby the circuit is adapted to be closed when a pallet is opposite said locator.

9. The combination in claim 6, including a projection on each pallet adapted to turn the pivoted part on an approaching pallet and actuate the releasable means thereon whereupon the latch on the approaching pallet is free to be turned about its axis by the carriers.

10. A free pallet conveyor including a travelling chain, longitudinal guide means for supporting the chain for movement therealong, carriers secured to and projecting at spaced intervals from the chain, tracks mounted in spaced relation to the guide means, pallets adapted to be advanced along the tracks, a latch pivoted on each pallet for engagement by one carrier whereby the pallet is advanced along the tracks, releasable means including a lever pivoted on each pallet for retaining the latch thereon in its carrier engaging position, limit switches supported at different heights relative and in spaced relation to the tracks, support means on each pallet upon which a workpiece is adapted to rest, a trip pivoted on each pallet and projecting outwardly therefrom, the inner extremity of the trip normally projecting above said support means and its outer extremity adapted to engage the lower limit switches, the inner extremity of the trip being adapted to be depressed by a workpiece on the support means whereby its outer extremity is raised to actuate the higher limit switches, each lever having an inclined camming face thereon, locators mounted for reciprocation at right angles to the tracks adapted to engage the camming faces and actuate the latch releasing means on the pallets, electrical means including a relay circuit for reciprocating each locator, each circuit including one of the limit switches whereby each loaded pallet is adapted to be stopped by some of the locators and each empty pallet is adapted to be stopped by the other locators, and each limit switch being positioned to complete a circuit when a pallet is opposite the locator connected thereto.

11. A free pallet conveyor including a travelling chain, longitudinal guide means for supporting the chain for movement therealong, carriers secured to and projecting at spaced intervals from the chain, tracks mounted in spaced relation to the guide means, pallets adapted to be advanced along the tracks, a latch pivoted on each pallet for engagement by one carrier whereby the pallet is advanced along the tracks, releasable means including a lever pivoted on each pallet for retaining the latch thereon in its carrier engaging position, a post mounted on each pallet, a vertically adjustabe trip on each post, supports mounted adjacent and in spaced relation to the tracks, a limit switch mounted for vertical adjustment on each support, the trips being adapted to actuate some of the limit switches, each lever having an inclined camming face thereon, locators mounted for reciprocation at right angles to the tracks to engage the camming faces and actuate the latch releasing means on the pallets, electrical means including a relay circuit for reciprocating each locator, and each circuit including one of the limit switches, each switch being positioned relative to the locator in its circuit whereby the circuit is adapted to be closed when a pallet is opposite said locator.

References Cited in the file of this patent

UNITED STATES PATENTS

| | | |
|---|---|---|
| 1,326,949 | Meehan | Jan. 6, 1920 |
| 1,706,211 | Coffey | Mar. 19, 1929 |
| 1,819,017 | Drake | Aug. 18, 1931 |
| 2,101,353 | Waalkes | Dec. 7, 1937 |
| 2,132,455 | Bishop | Oct. 11, 1938 |
| 2,572,011 | Cohen et al. | Oct. 23, 1951 |
| 2,619,370 | Leger | Nov. 25, 1952 |
| 2,619,916 | Rainier | Dec. 2, 1952 |
| 2,812,724 | King | Nov. 12, 1957 |